US011377380B2

(12) United States Patent
Kelley

(10) Patent No.: US 11,377,380 B2
(45) Date of Patent: Jul. 5, 2022

(54) METHOD FOR WASTEWATER TREATMENT

(71) Applicant: INLAND ENVIRONMENTAL RESOURCES, INC., Spokane, WA (US)

(72) Inventor: Douglas G. Kelley, Wenatchee, WA (US)

(73) Assignee: INLAND ENVIRONMENTAL RESOURCES, INC., Spokane, WA (US)

( * ) Notice: Subject to any disclaimer, the term of this patent is extended or adjusted under 35 U.S.C. 154(b) by 90 days.

(21) Appl. No.: 16/315,907

(22) PCT Filed: Oct. 16, 2018

(86) PCT No.: PCT/US2018/056142
§ 371 (c)(1),
(2) Date: Jan. 7, 2019

(87) PCT Pub. No.: WO2019/079343
PCT Pub. Date: Apr. 25, 2019

(65) Prior Publication Data
US 2021/0032146 A1    Feb. 4, 2021

Related U.S. Application Data

(60) Provisional application No. 62/615,391, filed on Jan. 9, 2018, provisional application No. 62/572,664, filed on Oct. 16, 2017.

(51) Int. Cl.
*C02F 11/04* (2006.01)
*B01D 19/04* (2006.01)
(Continued)

(52) U.S. Cl.
CPC .......... *C02F 11/04* (2013.01); *B01D 19/0404* (2013.01); *C02F 1/5245* (2013.01);
(Continued)

(58) Field of Classification Search
CPC .... B01D 19/0404; C02F 1/5245; C02F 11/04; C02F 11/12; C02F 11/143;
(Continued)

(56) References Cited

U.S. PATENT DOCUMENTS 5,616,241 A    4/1997 Khudenko
5,948,269 A    9/1999 Stone
(Continued)

FOREIGN PATENT DOCUMENTS

CN    205803256 U  * 12/2016
WO    2011/018556 A1    2/2011
(Continued)

OTHER PUBLICATIONS

USALCO white paper entitled, "Phosphorus Removal in Wastewater Treatment Plants Utilizing USALCO 38 (liquid sodium aluminate, 38% solids)", www.usalco.com. (Year: 2013).*
(Continued)

*Primary Examiner* — Chester T Barry
(74) *Attorney, Agent, or Firm* — Richard T. Black; Foster Garvey PC

(57) ABSTRACT

Compositions, systems, and methods of using alkaline-producing Aluminate salts in the sludge collection and digestion steps of wastewater processing to reduce acidity and/or build alkalinity, reduce hydrogen sulfide release, and reduce phosphate in the effluent.

9 Claims, 2 Drawing Sheets

(51) Int. Cl.
*C02F 1/52* (2006.01)
*C02F 101/10* (2006.01)

(52) U.S. Cl.
CPC .... *C02F 2101/101* (2013.01); *C02F 2209/06* (2013.01); *C02F 2209/26* (2013.01); *C02F 2301/046* (2013.01); *C02F 2303/02* (2013.01); *C02F 2303/08* (2013.01)

(58) Field of Classification Search
CPC ............ C02F 2101/101; C02F 2209/06; C02F 2209/26; C02F 2301/046; C02F 2303/02; C02F 2303/08; Y02W 10/20
See application file for complete search history.

(56) References Cited

U.S. PATENT DOCUMENTS

| | | | |
|---|---|---|---|
| 9,764,966 | B2 | 9/2017 | Van Der Heijden et al. |
| 2002/0088759 | A1* | 7/2002 | Krulik ................ C02F 1/5236 210/723 |
| 2005/0192199 | A1* | 9/2005 | Cartwright ........... C11D 3/3765 510/420 |
| 2011/0089122 | A1* | 4/2011 | Smith .................... B01D 33/04 210/774 |
| 2012/0118832 | A1* | 5/2012 | Yontz .................... C08F 220/16 210/728 |
| 2013/0134078 | A1* | 5/2013 | Bias ..................... B03D 1/1431 210/137 |
| 2015/0376043 | A1* | 12/2015 | Wett ......................... C02F 3/28 210/601 |
| 2016/0214874 | A1* | 7/2016 | Domb .................. C02F 1/5236 |
| 2016/0332899 | A1* | 11/2016 | Han .......................... C02F 9/00 |

FOREIGN PATENT DOCUMENTS

| | | | |
|---|---|---|---|
| WO | WO-2011018556 A1 * | 2/2011 | ............. C02F 1/465 |
| WO | 2017108930 A1 | 6/2017 | |

OTHER PUBLICATIONS

Machine translation of CN-205803256-U (Year: 2022).*
International Search Report and Written Opinion for PCT/US2018/056142, dated Dec. 21, 2018, 13 pages.

* cited by examiner

METHOD FOR WASTEWATER TREATMENT

RELATED APPLICATIONS

This application incorporates by reference in its entirety and claims priority to U.S. Provisional Application No. 62/572,664, filed Oct. 16, 2017.

This application incorporates by reference in its entirety and claims priority to U.S. Provisional Application No. 62/615,391, filed Jan. 8, 2018.

FIELD OF THE INVENTION

This invention relates generally to wastewater treatment and, more specifically, to reduction of odor and corrosion that can occur in a wastewater anaerobic digestion process.

BACKGROUND OF THE INVENTION

Modern wastewater treatment is a foundational element of nearly every community. In many facilities, the bulk of the focus has been on the treatment of raw sewage that enters and exits the facility, commonly known as water and wastewater streams. This process also creates a side product, known as sludge. This sludge is separated from the main water treatment line, and thereafter treated separately. Unfortunately, this sludge can be significantly malodorous.

In many wastewater plants, sludge captured from the bottom of the primary clarifier and secondary clarifier is combined and fed into an anaerobic digester. Anaerobic digestion uses microorganisms to breakdown the wastewater sludge in the absence of oxygen to reduce sludge volume.

Under anaerobic conditions, bacteria still require elemental oxygen for their metabolic functions. One primary chemical that is ubiquitous in water and wastewater streams is the sulfate ion ($SO_4^{2-}$). Certain anaerobic bacteria have sulfate reducing activity that, in essence, strip the oxygen-atoms from $SO_4^{2-}$, resulting in the formation of hydrogen sulfide ($H_2S$). $H_2S$ is a malodorous acidic gas that causes corrosion.

There is a long list of chemicals that are well known in the wastewater treatment industry as acceptable additives for the purpose of oxidizing or scavenging hydrogen sulfide, these include, for example, chlorine, bleach, hydrogen peroxide, ozone, potassium permanganate, ferric chloride, ferrous sulfate, sodium hydroxide, Quinone compounds, and magnesium hydroxide, and combinations thereof. One particular chemical treatment that is especially favored in the current wastewater collection system (sewer lines and lift stations) market involves the feed of a nitrate salt in order to provide an alternative oxygen source to sulfate for the bacteria to metabolize, resulting in the conversion of nitrate into odor-free and corrosion-free nitrogen gas.

Many of these hydrogen sulfide oxidizing or scavenging chemical treatments are applied into wastewater that is traveling through the sewer lines out in the collection system prior to reaching the wastewater treatment facility. However, in some cases, these additives have been employed at or within the wastewater treatment facility to reduce the formation of $H_2S$ at the plant. In particular, these treatment chemicals can be added within the anaerobic digestion process, in sludge, that is present in larger volume wastewater treatment plants.

One of the most widely applied chemicals for the control of $H_2S$ in anaerobic digesters is ferric chloride, $FeCl^3$, which is readily available and inexpensive. The ferric cation reacts rapidly with hydrogen sulfide to form a highly insoluble ferric sulfide precipitate. This solid results in the sulfide being trapped within the digested sludge and, thereby, mitigating the odor.

A significant detriment to the use of ferric chloride within an anaerobic digester is the acidic nature of the product. The commercial form of ferric chloride typically has a pH below 1, which is highly acidic. The addition of such an acidic product into the digester can destabilize the activity of the anaerobic bacteria. Reduced activity of the anaerobic bacteria can result in reduced methane production and lower sludge reduction. In addition, the acidic nature of ferric chloride can cause corrosive damage to metal surfaces that it encounters within the digester environment. This is especially important for digester tanks that have poor sludge mixing and or distribution systems that allow the acidic ferric chloride sludge to concentrate in localized areas within the tank and can result in severe accelerated corrosion damage. In addition, as a weak acid, $H_2S$ exists in equilibrium with the $HS^-$ anion according to the following equation:

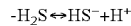

$$-H_2S \leftrightarrow HS^- + H^+$$

As the pH decreases (and the concentration of H+ increases) the equilibrium shifts to favor the $H_2S$ species—which is volatile, malodorous, and causes gas-phase corrosion of concrete and metal structures. Therefore, with the feed of an acidic product, such as ferric chloride, into an anaerobic digester, the decreased pH of the anaerobic sludge will shift the equilibrium to favor $H_2S$, and thus any $H_2S$ that did not react directly with the ferric chloride will be volatilized.

Compounds other than ferric chloride are commonly used as well. For example, aluminum-containing chemicals are used in the waste water treatment industry to react with suspended solids within the wastewater to form flocculated particles that enhance settling and dewatering of the sludge. The most common aluminum-containing chemicals that have been employed for this purpose are alum (aluminum sulfate), aluminum chloride, polyaluminum chloride, and aluminum chlorohydrate. However, these chemical products, like ferric chloride, are acidic in nature, and can therefore cause the same detrimental issues as mentioned above (reduced microorganism activity, reduced methane production, increased corrosion).

Non-acidic additives have been used in waste water treatment, but are limited to upstream additions aimed at general improvements in the coagulation of organic solids within the aerated sections of a wastewater treatment process, and improvements in phosphorus removal. For example, sodium aluminate has been added upstream to the primary flow of wastewater through a treatment plant. For example, as described in USALCO® "white paper" entitled "Phosphorus Removal in Wastewater Treatment Plants Utilizing USALCO® 38 (liquid sodium aluminate, 38% solid). This process is used in order to effectively remove soluble orthophosphate from the water. The addition of sodium aluminate as disclosed by USALCO®, has zero reductive effect on the production of hydrogen sulfide. USALCO® describes adding USALCO® 38 in four possible locations, none of which address sludge collected and removed from the main water line, and treated in the anaerobic digester.

The present invention overcomes and improves upon the prior art. The present invention utilizes an alkaline form of an aluminum-containing chemical for a new and novel purpose. For example, according to methods of the present invention, sodium aluminate (or other variations using alternative salts) is fed not at the upstream portion, or into the primary flow at all, and instead into the captured sludge destined for the anaerobic digester or directly into the anaerobic digester. In both of these non-limiting examples, utilization of the method taught according to the present invention reduces malodorous hydrogen sulfide. The method and system as taught according the various embodiments, has additional benefits, including increased pH, increased anaerobic activity, increased methane production, increased phosphorous capture in the sludge, decreased corrosive damage, and decreased struvite production.

Accordingly, there is a need in the art for a process that can reduce hydrogen sulfide odor, without the negative features present in the prior art.

DETAILED DESCRIPTION

In general terms, compositions and methods of using the alkaline form of an aluminum-containing chemical are described in the sludge collection and digestion steps of wastewater processing to effect $H_2S$ reduction in the sludge.

More particularly, various embodiments of the present invention teach systems, compositions, and methods of applying effective amounts of alkaline-producing aluminate salts, for example, but not limited to, sodium (Na) and/or potassium (K), into an anaerobic digester for the purpose of reducing the release of hydrogen sulfide. The reduction of hydrogen sulfide generation is effected by providing an alternative source of elemental oxygen, which increases the pH, at different wastewater processing points via sufficient exposure of alkaline-producing aluminate salts. This addition may occur with a primary sludge generated by wastewater treatment processes of incoming raw sewage, secondary sludge generated by partially processed sewage, and/or mixtures of primary sludge and secondary sludge.

Embodiments of the present invention teach the novel use of a soluble aluminum ion. For example, an alkaline form of an aluminum-containing chemical may be added to sludge, or an anaerobic digester. More specifically, in some embodiments of the present invention, the alkaline form of an aluminum-containing compound may be the combination of an aluminate anion, $AlO_2^-$ and various salts. The most common salts incorporating the aluminate anion are, for example, but not limited to, sodium aluminate ($NaAlO_2$) and potassium aluminate ($KAlO_2$).

Embodiments of the present invention using aluminate salt to reduce H2S simultaneously provide various benefits including, for example: enhancing the coagulation of orthophosphate and other suspended solids, and providing an increase in pH and alkalinity to the digester environment to improve the activity of the bacteria and increase the production of methane. Also, by increasing the pH of the digested sludge, the corrosivity of the overall system is reduced, thereby increasing the life of system components that would otherwise be eaten away by corrosive prior art chemical compositions.

The present invention comprises systems and methods for reducing odor and corresponding corrosion related to the production of hydrogen sulfide and other volatile organic sulfides within a waste water treatment facility, or anywhere else where anaerobic digestion of organic matter results in unwanted levels of hydrogen sulfide and other volatile organic sulfides. Embodiments of the present invention are understood with regards to the figures below.

Disclosed is a method for reducing odor and corresponding corrosion of hydrogen sulfide and volatile organic sulfides within a wastewater anaerobic digestion process which consists of feeding an alkaline form of aluminum into, or prior to, for example, the anaerobic digester in a wastewater treatment facility at various points.

Figure 1:
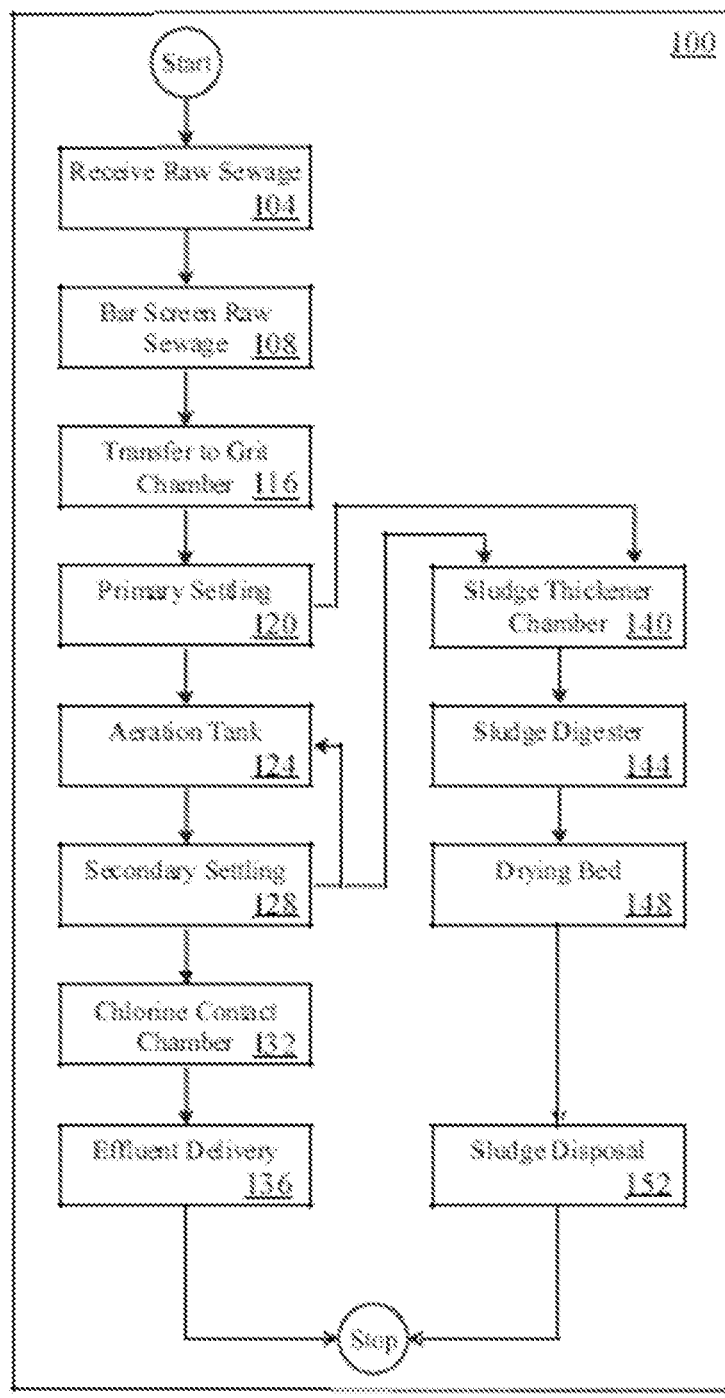
FIG. 1 is a schematic depiction of a prior art wastewater treatment process prone to generating high levels of $H_2S$.

FIG. 1 is a schematic depiction of a typical wastewater treatment process 100 prone to generating high levels of H2S. Process 100 commences with receiving incoming raw sewage at block 104 which is then subjected to a bar screen step at block 108, whereupon the screened sewage is transferred to a Grit Chamber 116. Thereafter at process block 120, a primary settling of settleable solids into a primary sludge occurs, wherein an effluent upper layer is directed to an aeration tank at block 124. After sufficient aeration, at process block 128 a secondary settling occurs and a cleaner effluent is routed for chlorination at in the Chlorine Contact Chamber 132. Should the cleaner effluent be deemed not sufficiently cleaned, a portion of the effluent emerging from the secondary settling tank 128 may be rerouted back to the aeration tank 124 for another aeration exposure. After sufficient chlorination of the cleaner effluents, a releasable-quality effluent is routed for recycling use at Effluent Delivery block 136, thereby completing the effluent side of the H2S prone wastewater process 100.

The primary sludge portions created at primary settling block 120 is then routed to the sludge thickener chamber at process block 140. Similarly, any secondary sludge created at secondary Settling block 128 is routed to the sludge thickener chamber 140 for mixing with any primary sludge already residing in the sludge thickener chamber 140. Thereafter the sludge is removed from the sludge digester 144 and delivered to the drying bed 148. After sufficient drying, the high level H2S containing dried sludge is disposed at block 152, thus completing the sludge side of the H2S prone wastewater process 100.

Figure 2:
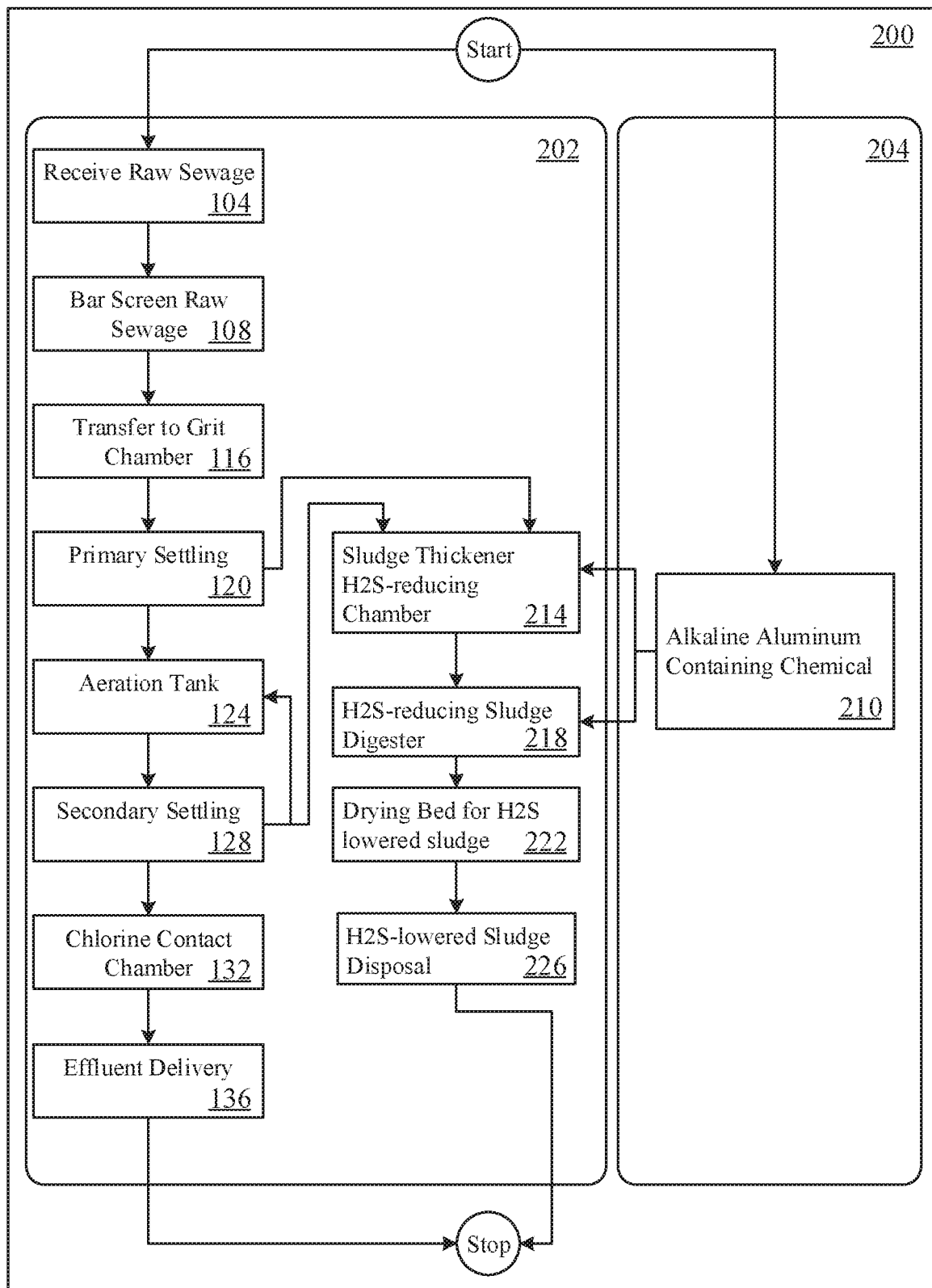
FIG. 2 is a schematic depiction of a wastewater treatment process configured to generate reduced levels of $H_2S$.

FIG. 2 is a schematic depiction of an H2S-reducing wastewater treatment process 200 configured to generate reduced levels of H2S residing within or emanating from sludge. The receipt of raw sewage to the generation of releasable-quality effluent for recycling is the same as the effluent side of process 100 described in FIG. 1. However, in this embodiment of the invention, the primary and/or secondary sludges are processed differently than the H2S prone process 100.

Referring again to FIG. 2, the sludge processing portion of process 100 has been modified to be an H2S-reducing process 202 working in concert with an alkaline-generating Aluminate Salt process 204. Accordingly, the sludge thickener chamber 140 and the sludge digester 144 of the process 100 described in FIG. 1 now receive sufficient quantities of H2S-reducing Aluminate salts such that each now respectively operate as a Sludge Thickener and H2S-reducing Chamber 214 and an H2S-reducing Sludge Digester 218 via receipt of alkaline aluminum containing chemicals from a dispenser 210. In some embodiments, the injection or introduction of aluminate salt (alone or in addition with other chemicals) may occur prior to the chamber 214 or digester 218, for example, in the piping leading to either. In such an embodiment, modification to the chamber 214 and or the digester 218 may not be necessary.

The introduction of aluminate salts from dispenser 210 result in the H2S-reducing process 202 that effects a sufficient reduction of H2S residing in and/or emanating from the sludges, either primary and/or secondary sludges that occupy the sludge thickener and H2S-reducing Chamber 214 and the H2S-reducing Sludge Digester 218, by their respective exposure to sufficient quantities of pH-raising Aluminate Salts received from the Dispenser 210. The alkaline-generating Aluminate Salt process 204 includes the dispenser 210 configured to add solid Aluminate Salts and/or liquid concentrates of same to the Sludge Thickener and H2S-reducing Chamber 214 and the H2S-reducing Sludge Digester 218.

The amount of aluminate salts dispensed is that effective amount deemed sufficient to reduce acidity by increasing the pH to a level that results in sufficient reduction of H2S residing within the sludge and/or emanating from the sludge occupying the Sludge Thickener and H2S-reducing Chamber 214 and the H2S-reducing Sludge Digester 218. The effective dose will also depend on the concentration of the sludge being treated. In some cases, the sludge will contain as little as 0.1% total solids (dilute sludge), while in other cases the sludge can contain 10% total solids (concentrated sludge). More commonly, the sludge concentration will be in the range of 1% to 5%. For these reasons, the effective dose of alkaline aluminum-containing product may be as low as 0.1 mg into 1.0 L of dilute sludge or as high as 1000 mg into 1.0 L of concentrated sludge.

The effective dose may also depend on the goal of the treatment. For example, three exemplary primary treatment goals follow, and the dose will depend on the most important goal of the processing plant. (1) Reduce acidity and/or build alkalinity: this improves microorganism activity and biogas (methane) production; (2) Reduce hydrogen sulfide release: this reduces odor and gas-phase corrosion, and results in a cleaner biogas for use as a renewable fuel; (3) Reduce phosphate in the effluent: this converts the soluble orthophosphate ions in the sludge into an insoluble aluminum phosphate precipitate that remains with the sludge, resulting in reduced total phosphate in the final effluent.

In various embodiments, dispenser 210 may only operate at one location, for example, at the thickener 214. In such an embodiment, additional amounts of an alkaline aluminum containing chemical may be necessary at that single location as compared to an embodiment with multiple dispensing points. The aluminum compound will continue to control H2S production within the sludge as the sludge moves from the thickener 214 to the digester 218 and beyond, so long as it remains a source of elemental oxygen. Increasing the amount of aluminum containing compound will increase the reduction of H2S, up unit the point where it no longer becomes effective because the sludge is sufficiently exposed. After the sludge exits the digester 218, the H2S-reduced sludge may be subjected to a drying process at the Drying Bed 222. Then, at block 226, the H2S-lowered sludge is disposed, thereby completing the H2S-reducing wastewater treatment process 200.

The exact system disclosed in FIG. 2 is only representative of a typical waste water treatment facility. In other embodiments, the exact components and order of operations may differ. However, in preferred embodiments, sludge is diverted, and treated, according to the methods disclosed herein.

Testing, using a process similar to that depicted in FIG. 2, has shown that Sodium Aluminate (39%) can achieve a comparable reduction of H2S as compared to two-times the dose of Ferric Chloride (39%). More specifically, in testing, treatment of 400 mL of sludge containing 120 mg/L of H2S with a dose of 1 mg/L of SA decreased the H2S to 16 mg/L (87% reduction), while treatment of 400 mL of sludge containing 112 mg/L of H2S with a dose of 2 mg/L of FC decreased the H2S to 8 mg/L (93% reduction). In addition, the resulting pH changes in each experiment were as follows: addition of 1 mg/L of SA raised the sludge pH from 5.97 to 7.58, resulting in a less corrosive and more biologically active sludge, while the addition of 2 mg/L of FC decreased the sludge pH from 5.97 to 4.56, resulting in a more corrosive, and less biologically active sludge.

In accordance with various examples of the invention, for example as depicted in FIG. 2, an alkaline form of aluminum may be fed into either the Sludge Thickener and H2S-reducing Chamber 214, or, alternatively, or in addition, into the H2S-reducing Sludge Digester 218. In various embodiments, an alkaline form of aluminum may be fed into the sewage stream just before the Chamber 214 or Digester 218. These locations may be referred to by various names, and should not be limited by the terminology used herein. In accordance with still further examples of the invention, the feed, or dispensing point 210 for the alkaline form of an aluminum-containing chemical may be, for example, either into the influent stream that introduces new sludge into the digester 218, or into the recirculation stream that recirculates the sludge within the digester 218, or using a split feed into both feed points. In other embodiments, for example referring back to FIG. 2, the alkaline form of an aluminum-containing chemical may be added in the stream that leads to the Thickener 214, or, alternatively, the stream between the Thickener 214 and the Sludge Digester 218. The aluminum containing chemical may be added as a solid, powder, or hydrated liquid at any of the various points disclosed herein. Further, different forms and types of aluminum containing chemicals may be used at different points to reduce the release of hydrogen sulfide by trapping malodorous hydrogen sulfide gas in the sludge.

Further, the mixture dispensed by dispenser 210 may be composed of any number of combinations of alkaline aluminum containing salt. For example, Sodium Aluminate and Potassium Aluminate, along with various other impurities that may be present, may be combined and dispended into the sludge stream at any point disclosed herein. Additionally, different alkaline aluminum containing compounds or mixtures may be dispensed at different points.

Many variations of the compounds used according to the present invention are possible. For example, the sodium aluminate embodiment may utilize any number of variations of the generic compound, including at least, but not limited to: $Na_2Al_2O_4$, $NaAl(OH)_4$, $Na_2Al_2O_3$, $Na_5AlO_4$, $NaAl_3O_8$ or other commercially available variations, all of which are deemed to be encompassed by the general term sodium aluminate. While the example above relates to the sodium aluminate embodiment, the same logic applies to all other chemical variations and mixtures contemplated by the present invention. Further, commercially available versions of the compounds described herein may also include any number of additional compounds. Due to the environment in which the chemicals are introduced, other reactions and intermediaries may occur, and products may differ slightly from those specifically described herein, but are considered within the scope of the present invention.

In accordance with yet another example of the invention, the use of one or more additional alkaline substances, such as magnesium hydroxide, magnesium oxide, calcium hydroxide, calcium oxide, soda ash, sodium bicarbonate, potash, or ammonia, or blends thereof may be used. Such additional alkaline substances may increase the pH and alkalinity of the overall anaerobic digester environment.

These additional alkaline substances may be used, for example, in instances where the need for increased pH and alkalinity is greater than what can be provided through the singular feed of sodium aluminate. These additional substances may be added separately, or, alternatively, at the same time as the primary aluminum containing chemical. Further, more than one additional alkaline substance may be used, and where two or more are used, they may be mixed prior to or at the time of addition into the digester. According to various examples, by increasing the pH and alkalinity of the overall anaerobic digester environment, the great majority of the hydrogen sulfide will be maintained in the anionic HS− form, which is nonvolatile and water soluble. By maintaining the great majority of sulfide species within the water-phase, odor will be minimized and the opportunity for enhancing the contact time for interaction between the sulfide species and the aluminum cations (present from the use of sodium aluminate) will be maximized.

In some embodiments the alkaline aluminum compound may be hydrated, for example. The hydrated variation of the compounds taught according to the present invention may be used where a liquid application method would be preferable.

In further embodiments, one or more additional alkaline substances, by non-limiting example: magnesium hydroxide, magnesium oxide, calcium hydroxide, calcium oxide, soda ash, sodium bicarbonate, potash and or ammonia, may be added to the anaerobic digester.

Any number of these additional one or more alkaline substances may be blended into a single chemical mixture with the alkaline aluminum-containing chemical. In other embodiments, the one or more additional alkaline substances may be added separately to the anaerobic digester in conjunction with the alkaline aluminum-containing chemical, or may be added in phases, for example, before, during and after the addition of the aluminum-containing chemical.

In further embodiments, various additional chemicals may be added to, or at the same time, as the alkaline form of an aluminum containing chemical. These additional chemicals may regulate other conditions within the sludge, or act to assist the alkaline form of an aluminum containing chemical.

In methods according to an embodiment of the present invention where a alkaline aluminum containing chemical is introduced into the captured sludge destined for the anaerobic digester, or alternatively, into the anaerobic digester, the process benefits from the chemical's high pH. Commercially available USALCO® 38, for example, has a pH of approximately 14 (a 1% solution has pH of 11.5). This has the benefit of providing an increase in pH and alkalinity to the digester environment. The increased pH and alkalinity can improve the activity of the bacteria and increase the production of methane. The increased pH will also shift the equilibrium of the H2S such that the majority of the H2S will exist in the HS− anion form, which is nonvolatile. Since HS− is nonvolatile, the release of the acidic H2S gaseous molecule is mitigated and both odor and gas-phase corrosion are reduced. Other embodiments of the present invention, including variations of aluminum hydroxide, sodium aluminate, or potassium aluminate, achieve the same or similar benefits as those described.

In addition to increasing anaerobic production, the addition of aluminum reduces the buildup of struvite. In many anaerobic digesters ammonia NH3 and phosphate PO4 are present in significant amounts. When they come into contact with magnesium, they produce a hard, scaling solid call struvite. The aluminum may bind to phosphorus found within the sludge, reducing the amount of MgNH4PO4 that can form. As a result, the digester, as well as any lines attached thereto, for mixing and or transporting sludge are less likely to become clogged by struvite slag.

In accordance with still another example of the invention, the various gases produced by, for example, the anaerobic digester, may be fed through a filtration system which includes an alkaline form of aluminum, for example in a powder or liquid form. The resulting material may then be returned to the digester, discarded, or used for other purposes.

In accordance with still further examples of the invention, an alkaline form of aluminum can be added to a digester using an automated system. For example, an automated system may include various sensors and control modules in order to control the conditions in the thickener or digester. Sensors may provide information about pH, H2S concentrations, Phosphorus concentration, temperature, or any other useful metric. Using this information, the controller can compare the sensed values to optimum values and add or reduce the addition of aluminum salts as necessary. Further, in more complex systems, the system may sense the need for additional alkaline substances, such as those described above, in response to, for example, a desired increase in pH. In accordance with further examples of the invention, an alkaline form of aluminum is added directly to the sludge, either automatically, manually or some combination of the two.

In accordance with still further examples of the invention, the addition of an alkaline form of aluminum is a component of a larger methane capture system built into the water treatment process, where the addition of the alkaline form of aluminum increases methane production, while reducing hydrogen sulfide. As a result, it is easier to isolate the desired methane byproduct, which can then be stored, transferred or used on site as a means of power generation, for example in a gas-fired generator.

In accordance with various examples of the present invention, and as depicted in the Figs, sludge is separated from the main water line in a water treatment facility, for example at 120 or 128, the sludge is diverted. The separated sludge may then make its way to an anaerobic digester 218. In certain alternative embodiments, the sludge may be treated with an alkaline form of aluminum as it is traveling to the anaerobic digester 218. Once the sludge reaches the anaerobic digester 218, an alkaline form of aluminum is added. As a result of this addition, the amount of H2S reaching the gaseous phase is reduced, thereby reducing the malodor as well as decreasing the corrosive effects of H2S gas. In addition, the pH of the sludge increases, resulting in increased aerobic activity, producing more methane gas which may be beneficially captured. As the global market continues to look for energy alternatives to fossil fuels, there is a growing interest in anaerobic digestion of human and animal waste. The present invention may increase the possible harvest yield of methane during the wastewater treatment process. Various methods according to the present invention may incorporate methane capture components and techniques. For example, the methane may be captured from above the digester as it rises. The methane may then be separated from any remaining oxygen, for example by separating components based on their density. This captured methane may then be further processed, stored, or burned in a gas-fire type generator, for example. Many other possibilities exist, and the scope of the present invention should not be limited to the limited embodiments described here.

Further, aluminum ions may bond with phosphorous ions within the sludge, reducing the formation of struvite. In some additional embodiments, the alkaline form of aluminum may be added as one component of a multi-part treatment process, and may be added continuously to the thickener 214 and/or the anaerobic digester 218, or in one or more additions throughout the process.

In some embodiments, the chemicals may be introduced using an automated system, which in some embodiments, may respond automatically using any number of sensors. For example, in one embodiment of the present invention, the chemicals may be introduced when a user requests the system feed the chemicals into the sludge. In another embodiment, the system may contain a number of sensors which automatically request that the chemicals be added. These sensors may, in coordination with the system, determine the amount of alkaline form of an aluminum containing chemical that is necessary, and may be able to adjust the dosage to accommodate the actual environment in the digester. In other embodiments, one or multiple hoppers may be used to store various chemicals, as taught by the present invention, to the sludge. The actuation of these hoppers, such that they add an effective amount of the one or more chemicals, may be controlled manually or automatically.

The teachings of the present invention may also be useful in other use cases where H2S and pH control is desired. For example, an alkaline form of aluminum can be added, as a solid, powder, or liquid, to various other locations where anaerobic digestion is underway, for example, an outhouse, mobile restroom, or farm yard retention pond. In one specific example, at concentrated animal feeding operations (CAFO), some retention ponds have been converted into anaerobic digesters. The methods taught herein may be used in order to provide the various benefits discussed herein to CAFOs. Further, in some situations, the organic matter may be removed from a CAFO and dried prior to transport. In some embodiments an alkaline form of aluminum can be added during this drying and mixing stage in order to provide the benefits discussed herein.

While the preferred embodiment of the invention has been illustrated and described, as noted above, many changes can be made without departing from the spirit and scope of the invention. For example, sodium aluminate has been described, but many other variations, for example by changing the salt bonded to the aluminate ion, are possible. And, further, the method has been described with respect to a wastewater treatment facility, but the teachings herein can be applied elsewhere and are within the scope of the invention. Accordingly, the scope of the invention is not limited by the disclosure of the preferred embodiment. Instead, the invention should be determined entirely by reference to the claims that follow.

I claim:

1. A method of reducing gaseous $H_2S$ production from anaerobic waste water sludge comprising: in a sewage treatment plant, adding an effective amount of an alkaline form of an aluminum containing chemical to a waste water sludge to which no aluminum-containing chemical had been added, wherein the alkaline aluminum-containing chemical is selected from the group consisting of sodium aluminate, potassium aluminate, and mixtures thereof, wherein the addition of the alkaline aluminum-containing chemical occurs at a feed point, wherein the feed point is either immediately prior to an anaerobic digester or directly into an anaerobic digester.

2. A method of claim 1 wherein the feed point is into an influent stream, wherein the influent stream introduces new sludge into the anaerobic digester.

3. A method of claim 2 further comprising
feeding an alkaline form of an aluminum-containing chemical into a sludge flowing through a recirculation line of the anaerobic digester, wherein the feeding occurs at one or more recirculation line feed points.

4. A method of claim 1 further comprising the addition of one or more additional alkaline substances to the waste water sludge selected from the group consisting of magnesium hydroxide, magnesium oxide, calcium hydroxide, calcium oxide, soda ash, sodium bicarbonate, potash and ammonia.

5. A method of claim 4 further comprising where the one or more additional alkaline substances and the alkaline aluminum containing chemical are blended into a single chemical mixture.

6. A method of claim 1, wherein the alkaline aluminum containing chemical is added in an amount of between 0.1 mg/L and 1000 mg/L.

7. A method of claim 1, wherein the alkaline aluminum containing chemical is added in an amount to raise the pH of the waste water sludge above 7.0.

8. A method of claim 4, wherein the alkaline aluminum containing chemical and the one or more additional alkaline substances are added in an amount such that a majority of the $H_2S$ exists in $HS^-$ anion form.

9. A method of claim 1, wherein buildup of struvite is inhibited.

* * * * *